US011511858B2

(12) United States Patent
Amsili et al.

(10) Patent No.: US 11,511,858 B2
(45) Date of Patent: Nov. 29, 2022

(54) SYSTEM AND METHOD FOR A SENSOR WALL PLACING UAV

(71) Applicant: PEARLS OF WISDOM ADVANCED TECHNOLOGIES LTD., Netanya (IL)

(72) Inventors: Shay Amsili, Netanya (IL); Doron Eyal, Netanya (IL); Yariv Yoseph Land, Netanya (IL)

(73) Assignee: PEARLS OF WISDOM ADVANCED TECHNOLOGIES LTD., Netanya (IL)

( * ) Notice: Subject to any disclaimer, the term of this patent is extended or adjusted under 35 U.S.C. 154(b) by 8 days.

(21) Appl. No.: 17/298,682

(22) PCT Filed: Nov. 3, 2019

(86) PCT No.: PCT/IL2019/051196
§ 371 (c)(1),
(2) Date: Jun. 1, 2021

(87) PCT Pub. No.: WO2020/152665
PCT Pub. Date: Jul. 30, 2020

(65) Prior Publication Data
US 2022/0041281 A1    Feb. 10, 2022

(30) Foreign Application Priority Data

Jan. 22, 2019   (IL) .......................... 264394

(51) Int. Cl.
*B64C 39/02* (2006.01)
*B64D 27/24* (2006.01)
(Continued)

(52) U.S. Cl.
CPC ............ *B64C 39/024* (2013.01); *B64D 27/24* (2013.01); *B64D 47/08* (2013.01); *G05D 1/0094* (2013.01);
(Continued)

(58) Field of Classification Search
CPC ............ B64C 39/024; B64C 2201/027; B64C 2201/042; B64C 2201/108;
(Continued)

(56) References Cited

U.S. PATENT DOCUMENTS

| 6,056,237 A | 5/2000 | Woodland |
| 8,138,968 B1 | 3/2012 | Butler |

(Continued)

FOREIGN PATENT DOCUMENTS

| EP | 2003057 A2 | 12/2008 |
| EP | 3681799 B1 | 9/2021 |
| ES | 2614994 A1 | 6/2017 |

OTHER PUBLICATIONS

Mattar, Rami; Kalai, Remy. Development of a Wall-Sticking Drone for Non-Destructive Ultrasonic and Corrosion Testing. Drones, 2018, 2.1: 8. Mattar, Rami; Kalai, Feb. 24, 2018.

(Continued)

*Primary Examiner* — Benjamin P Lee

(57) ABSTRACT

A sensor wall placing Unmanned Aerial Vehicle (UAV) comprising: a UAV frame; a plurality of motors; a mounting mechanism configured to detachably attach a sensor casing comprising at least one sensor, during flight of the sensor wall placing UAV, the mounting mechanism being connected to a top part of the sensor wall placing UAV so that the mounting mechanism is facing upwards from the top part of the sensor wall placing UAV, and upon detachably attaching the sensor casing to the mounting mechanism, a face of the sensor casing faces away from the sensor wall placing UAV thereby enabling the sensor wall placing UAV to perform a maneuver that results in direct contact between the face of the sensor casing and a target wall.

20 Claims, 5 Drawing Sheets

(51) Int. Cl.
  *B64D 47/08* (2006.01)
  *G05D 1/00* (2006.01)
  *G05D 1/10* (2006.01)
(52) U.S. Cl.
  CPC ........ *G05D 1/101* (2013.01); *B64C 2201/027* (2013.01); *B64C 2201/042* (2013.01); *B64C 2201/108* (2013.01); *B64C 2201/12* (2013.01); *B64C 2201/18* (2013.01)
(58) Field of Classification Search
  CPC .......... B64C 2201/121; B64C 2201/12; B64C 2201/18; B64D 27/24; B64D 47/08; G05D 1/0094; G05D 1/101
  See application file for complete search history.

(56) References Cited

U.S. PATENT DOCUMENTS

| | | | | |
|---|---|---|---|---|
| 10,265,855 | B2* | 4/2019 | Myeong | B25J 9/1676 |
| 11,077,935 | B2* | 8/2021 | Carrasco Zanini | B64C 39/024 |
| 11,104,552 | B2* | 8/2021 | Byers | B64C 39/024 |
| 11,106,208 | B2* | 8/2021 | Alshamrani | G06K 7/1417 |
| 2007/0266884 | A1 | 11/2007 | Finneral et al. | |
| 2016/0068261 | A1 | 3/2016 | Niederberger | |
| 2017/0123435 | A1* | 5/2017 | Myeong | B25J 9/1676 |
| 2017/0209885 | A1 | 7/2017 | Neustadt | |
| 2019/0323866 | A1* | 10/2019 | Heafitz | G01D 11/30 |
| 2019/0369057 | A1* | 12/2019 | Mattar | G01N 29/265 |
| 2020/0031473 | A1* | 1/2020 | Martens | B64D 1/22 |
| 2020/0142432 | A1* | 5/2020 | Kwak | B64D 47/08 |
| 2021/0347476 | A1* | 11/2021 | Hishida | B64C 39/02 |
| 2022/0063038 | A1* | 3/2022 | Monsarrat | F16B 47/00 |
| 2022/0106039 | A1* | 4/2022 | Müller | B64D 27/24 |

OTHER PUBLICATIONS

Sørensen, L.Y., Jacobsen, L.T. and Hansen, J.P., Low Costand Flexible UAV Deployment of Sensors. Sensors, 17(1), p. 154., Jan. 25 14, 2017.

Shin, J.U., Kim, D., Kim, J.H. and Myung, H., Micro Aerial Vehicle Type Wall-Climbing Robot Mechanism. In Ro-Man, 2013 IEEE (pp. 722-725). IEEE., Aug. 26, 2013.

Albert Albers et al: "Semi-autonomous flying robot for physical interaction with environment" Robotics Automation and Mechatronics (RAM), 2010 IEEE Conference On, IEEE, Piscataway, NJ, USA, Jun. 28, 2010.

* cited by examiner

SYSTEM AND METHOD FOR A SENSOR WALL PLACING UAV

TECHNICAL FIELD

The invention relates to a system and method for a sensor wall placing Unmanned Aerial Vehicles (UAV).

BACKGROUND

UAVs are commonly used nowadays to take part or to accomplish various missions or tasks that in the past required manned aircrafts. These missions may include civilian missions, such as: disaster relief, archeology, conservation (pollution monitoring, anti-poaching, etc.), law enforcement, and anti-terrorism missions, as well as commercial missions, such as: aerial surveillance, filmmaking, journalism, scientific research, surveying, cargo transport, and agriculture and many other relevant missions, that can be accomplished by an unmanned aircraft.

One kind of tasks delegated to UAVs are the placement of sensors, specifically the placement of sensors in hard to reach places. An example of such a task may be the placement of sensors on a wall. The sensors to be placed depend on the task the UAV is taking part in, and may be of varying kinds, such as: cameras, microphones, radars, acoustic sensors, proximity sensors, ultrasonic sensors, seismic sensors or any other type of sensor that can be placed by a UAV. The task can additionally include placing, by the UAV, a communication device to support communication within the mission area.

The environment where the sensors are to be placed can be a harsh environment and may be unreachable for humans or for human operated vehicles. There is thus a need in the art for a new method and system for a sensor wall placing UAV.

It is to be noted that the terms UAV and drone are used herein interchangeably.

References considered to be relevant as background to the presently disclosed subject matter are listed below. Acknowledgement of the references herein is not to be inferred as meaning that these are in any way relevant to the patentability of the presently disclosed subject matter.

Mattar, R. A. and Kalai. R., DEVELOPMENT OF A WALL-STICKING DRONE FOR NON-DESTRUCTIVE ULTRASONIC AND CORROSION TESTING, in Drones, 2(1), published on Feb. 24, 2018, discloses a Refineries' structures requiring constant inspection, maintenance of their structural health condition, and safety of the users; however, accessing these structures is getting more and more difficult due to their enormous height and size. In order to deal with this problem, many researchers have developed several robots for wall crawling, yet there is no guaranteed solution. One of the critical reasons why existing wall-crawling robots have not been available in the field is the risk of accidental fall due to operational failure from the harsh environment, like strong wind and the surface's unpredictable condition. Therefore, we attempted to develop a wall-sticking aerial robot platform that can approach any place of the structure by flying and sticking to the target place. The robot is equipped with electro-magnetic hold mount elements to stick the sensor probe on the surface of the structure.

EP Patent Application No. 2 003 057 A2 discloses a manipulator arm system on a ducted air-fan UAV. The target site may be accurately located by the UAV, and the manipulator system may accurately locate the payload at the target site. The manipulator arm may select tools from a toolbox located on-board the UAV to assist in payload placement or the execution of remote operations. The system may handle the delivery of mission payloads, environmental sampling, and sensor placement and repair.

U.S. Pat. No. 6,056,237 (Woodland) published on May 2, 2000, discloses a sonotube-compatible unmanned aerial vehicle apparatus, hereinafter referred to as a UAV, and systems for launch and control of the UAV. The UAV is generally comprised of modular sections including a nose section, a payload section, a wing and fuel tank section, and a powerplant section. The modular sections are attached to adjacent sections by uniform lock sealing rings and related components. The present invention comprises an apparatus enabling very small, man portable, ballistically launched, autonomously or semi-autonomously controlled vehicle to be deployed with preprogrammed, communicated, or telemetry mission programming. A wide range of payload packages, including emergency supplies, sensors, and antenna assemblies, may be carried, used or deployed in flight. Man-portable operation is accomplished by the use of a launch canister apparatus. The launch canister comprises retractable launch stabilizing legs, turbine engine exhaust orifices, and various antennas. The launch canister apparatus alternatively comprises a modified type "A", "B", or "C" sonotube launch canister. The system of the invention also comprises a portable Command, Control, Communications, Computer, and Intelligence (C4I) control and sensing analysis console. The console is preferably ruggedized, waterproof, shockproof, and comprises necessary control and analysis computers, input/output devices, antennas, and related hardware and software for vehicle and mission control. A C4I console and/or launch canisters may be transported by means of a backpack adapted for man portability.

US Patent application No. 2007/0266884 (Finneral et al.) published on Nov. 22, 2007, discloses a dispenser system provides a means to automatically deploy systems using a controlled dispense approach capable of providing desired operational flexibility. Components such as unattended ground sensors (UGS) are deployed according to a method which includes incorporating the components into an elongated ejection system to form a payload assembly, the ejection system including axially-displaced ejector bays each for holding respective components. Each ejector bay retains the respective components until a respective ejection event upon which the ejector bay ejects the components in a radial direction. The payload assembly includes a stabilizer such as a drogue parachute that substantially prevents the payload assembly from rotating about its elongated axis. A timing sequence for the ejection events is programmed into the ejection system to achieve a desired coverage pattern of the components after deployment. The timing sequence can be chosen to result in a coverage pattern along a continuum from maximum component density to maximum total area coverage. The payload assembly is subsequently released from an aerial vehicle above the area with activation of the timing sequence, such that the ejection events occur during flight of the payload assembly at respective times after its release.

U.S. Pat. No. 8,138,968 (Butler) published on Mar. 20, 2012, discloses a High-Performance Unattended Ground Sensor (HiPer-UGS) system and methods comprising low-power fully functional and independent radar-nodes that communicate directly with a remote radar information gathering or relay point using a long-distance communications transceiver co-located in the radar-node.

Sorensen, L. Y., Jacobsen, L. T. and Hansen, J. P., LOW COST AND FLEXIBLE UAV DEPLOYMENT OF SENSORS. SENSORS, 17(1), P. 154, published on Jan. 14, 2017, discloses a platform for airborne sensor applications using low-cost, open-source components carried by an easy-to-fly unmanned aircraft vehicle (UAV). The system, available in open-source, is designed for researchers, students and makers for a broad range of exploration and data-collection needs. The main contribution is the extensible architecture for modularized airborne sensor deployment and real-time data visualization. Our open-source Android application provides data collection, flight path definition and map tools. Total cost of the system is below 800 dollars. The flexibility of the system is illustrated by mapping the location of Bluetooth beacons (iBeacons) on a ground field and by measuring water temperature in a lake.

Shin, J. U., Kim, D., Kim, J. H. and Myung, H., MICRO AERIAL VEHICLE TYPE WALL-CLIMBING ROBOT MECHANISM. IN RO-MAN, 2013 IEEE (PP. 722-725). IEEE., published on Aug. 26, 2013, discloses that nowadays, as the building structures are getting taller and taller, the importance of maintenance or inspection of these structures is being increased. However, it has some problems due to the lack of professional manpower and there is a risk in maintaining those areas that are hard to reach, besides the high maintenance cost. The unmanned wall-climbing robots for the areas hard to reach have been researched to solve the problems. The infrastructure-based wall-climbing robots have high payload and safety but the robots need the infrastructure that should be installed on the target structure. The infrastructure is not preferred by the architects since it can be harmful to the exterior of the structure. For this reason, wall-climbing robots that do not need any infrastructure are being researched. Nevertheless, most of the non-infrastructure-based wall-climbing robots are in the laboratory level since the payload, safety and maneuverability are not satisfactory. To overcome these problems, a flight-possible wall-climbing robot mechanism is proposed in this paper. The robot is based on the quadrotor system that is a well-known aerial vehicle using four rotors. It uses thrust forces induced by the four rotors not only to fly but also to stick on the wall. The flight capability makes its maneuverability and safety greatly enhanced. The feasibility of the mechanism is shown through simulations and experiments with a prototype.

General Description

In accordance with a first aspect of the presently disclosed subject matter, there is provided a sensor wall placing Unmanned Aerial Vehicles (UAV) comprising: a UAV frame; a plurality of motors connected to the UAV frame and capable of lifting and maneuvering the sensor wall placing UAV: a mounting mechanism configured to detachably attach, via an interface, a sensor casing comprising at least one sensor during flight of the sensor wall placing UAV, the mounting mechanism being connected to a top part of the sensor wall placing UAV so that the mounting mechanism is facing upwards from the top part of the sensor wall placing UAV, and upon detachably attaching the sensor casing to the mounting mechanism, a face of the sensor casing faces away from the sensor wall placing UAV thereby enabling the sensor wall placing UAV to perform a maneuver that results in direct contact between the face of the sensor casing and a target wall; and a processing resource configured to: fly, using the motors, the sensor wall placing UAV to a target spatial disposition with respect to the target wall on which the sensor is to be placed; upon reaching the target spatial disposition, perform a maneuver of the sensor wall placing UAV, so that the face of the sensor casing is in direct contact with the target wall: and activate the motors in a direction that generates a thrust of the sensor wall placing UAV towards the target wall for at least a given time period, thereby enabling adhesion of the sensor casing to the target wall when the sensor casing is covered with adhesive.

In some cases, the mounting mechanism is connected to the sensor wall placing UAV via a movable joint.

In some cases, the interface is releasable and wherein the processing resource is further configured to: turn off the motors after the given time period, thereby stopping the thrust towards the target wall, wherein upon turning off the motors, the sensor wall placing UAV assumes a placement with respect to the target wall as allowed by the movable joint: and release the interface, thereby disconnecting the sensor casing from the sensor wall placing UAV, thereby leaving the sensor casing adhered by the adhesive to the target wall.

In some cases, the placement with respect to the target wall is in an angle between 30-150 degrees.

In some cases, the processing resource is further configured to activate the motors, upon the release, to fly the sensor wall placing UAV to a next location.

In some cases, the adhesive is covered with a liner, and the sensor wall placing UAV further comprises a liner removal mechanism, configured to remove the liner before performance of the maneuver.

In some cases, the processing resource is configured to perform the maneuver upon a maneuver trigger, wherein the maneuver trigger includes one of: (a) a proximity sensor of the sensor wall placing UAV indicates that the sensor wall placing UAV is at a given distance from the target wall; (b) an accelerometer of the sensor wall placing UAV indicates that the sensor wall placing UAV made contact with the target wall; or (c) a touch sensor indicates that a part of the wall placing UAV on which the touch sensor is placed made contact with the target wall.

In some cases, the target spatial disposition is defined by a given position from the target wall and a given orientation of the sensor wall placing UAV with respect to the target wall.

In some cases, the sensor wall placing UAV further comprises one or more distance determination sensors, including one or more of: a Light Detection And 1o Ranging (LIDAR): a proximity sensor; a sonar: a Time Of Flight (TOF) camera: or an Infra-Red (IR) sensor.

In some cases, the processing resource is further configured to determine a current spatial disposition of the sensor wall placing UAV with respect to the target wall based on a plurality of readings obtained by the distance determination sensors, wherein a first reading is obtained from a first orientation of the distance determination sensors with respect to the target wall and a second reading is obtained from a second orientation of the distance determination sensors with respect to the target wall.

In accordance with a second aspect of the presently disclosed subject matter, there is provided a method of operating a sensor wall placing Unmanned Aerial Vehicles (UAV), the sensor wall placing UAV having: a UAV frame; a plurality of motors connected to the UAV frame and capable of lifting and maneuvering the sensor wall placing UAV: and a mounting mechanism configured to detachably attach, via an interface, a sensor casing comprising at least one sensor during flight of the sensor wall placing UAV, the mounting mechanism being connected to a top part of the sensor wall placing UAV so that the mounting mechanism is facing upwards from the top part of the sensor wall placing UAV, and upon detachably attaching the sensor casing to the mounting mechanism, a face of the sensor casing faces away from the sensor wall placing UAV thereby enabling the sensor wall placing UAV to perform a maneuver that results in direct contact between the face of the sensor casing and a target wall; the method comprising: flying, using the motors, the sensor wall placing UAV to a target spatial disposition with respect to the target wall on which the sensor is to be placed; upon reaching the target spatial disposition, performing a maneuver of the sensor wall placing UAV, so that the face of the sensor casing is in direct contact with the target wall; and activating the motors in a direction that generates a thrust of the sensor wall placing UAV towards the target wall for at least a given time period, thereby enabling adhesion of the sensor casing to the target wall when the sensor casing is covered with adhesive.

In some cases, the mounting mechanism is connected to the sensor wall placing UAV via a movable joint.

In some cases, the interface is releasable and the method further comprises: turning off the motors after the given time period, thereby stopping the thrust towards the target wall, wherein upon turning off the motors, the sensor wall placing UAV assumes a placement with respect to the target wall as allowed by the movable joint; and releasing the interface, thereby disconnecting the sensor casing from the sensor wall placing UAV, thereby leaving the sensor casing adhered by the adhesive to the target wall.

In some cases, the placement with respect to the target wall is in an angle between 30-150 degrees between.

In some cases, the method further comprising activating the motors, upon the releasing, to fly the sensor wall placing UAV to a next location.

In some cases, the adhesive is covered with a liner, and the method further comprises removing the liner, using a liner removal mechanism, before performance of the maneuver.

In some cases, the maneuver is performed upon a maneuver trigger, wherein the maneuver trigger includes one of: (a) a proximity sensor of the sensor wall placing UAV indicates that the sensor wall placing UAV is at a given distance from the target wall; (b) an accelerometer of the sensor wall placing UAV indicates that the sensor wall placing UAV made contact with the target wall: or (c) a touch sensor indicates that a part of the wall placing UAV on which the touch sensor is placed made contact with the target wall.

In some cases, the target spatial disposition is defined by a given position from the target wall and a given orientation of the sensor wall placing UAV with respect to the target wall.

In some cases, the sensor wall placing UAV further comprises one or more distance determination sensors, including one or more of: a Light Detection And Ranging (LIDAR): a proximity sensor: a sonar; a Time Of Flight (TOF) camera; or an Infra-Red (IR) sensor.

In some cases, the method further comprising determining a current spatial disposition of the sensor wall placing UAV with respect to the target wall based on a plurality of readings obtained by the distance determination sensors, wherein a first reading is obtained from a first orientation of the distance determination sensors with respect to the target wall and a second reading is obtained from a second orientation of the distance determination sensors with respect to the target wall.

In accordance with a third aspect of the presently disclosed subject matter, there is provided a non-transitory computer readable storage medium having computer readable program code embodied therewith, the computer readable program code, executable by a processing resource of a computer to perform a method of operating a sensor wall placing Unmanned Aerial Vehicles (UAV), the sensor wall placing UAV having: a UAV frame; a plurality of motors connected to the UAV frame and capable of lifting and maneuvering the sensor wall placing UAV; and a mounting mechanism configured to detachably attach, via an interface, a sensor casing comprising at least one sensor during flight of the sensor wall placing UAV, the mounting mechanism being connected to a top part of the sensor wall placing UAV so that the mounting mechanism is facing upwards from the top part of the sensor wall placing UAV, and upon detachably attaching the sensor casing to the mounting mechanism, a face of the sensor casing faces away from the sensor wall placing UAV thereby enabling the sensor wall placing UAV to perform a maneuver that results in direct contact between the face of the sensor casing and a target wall; the method comprising: flying, using the motors, the sensor wall placing UAV to a target spatial disposition with respect to the target wall on which the sensor is to be placed; upon reaching the target spatial disposition, performing a maneuver of the sensor wall placing UAV, so that the face of the sensor casing is in direct contact with the target wall: and activating the motors in a direction that generates a thrust of the sensor wall placing UAV towards the target wall for at least a given time period, thereby enabling adhesion of the sensor casing to the target wall when the sensor casing is covered with adhesive.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
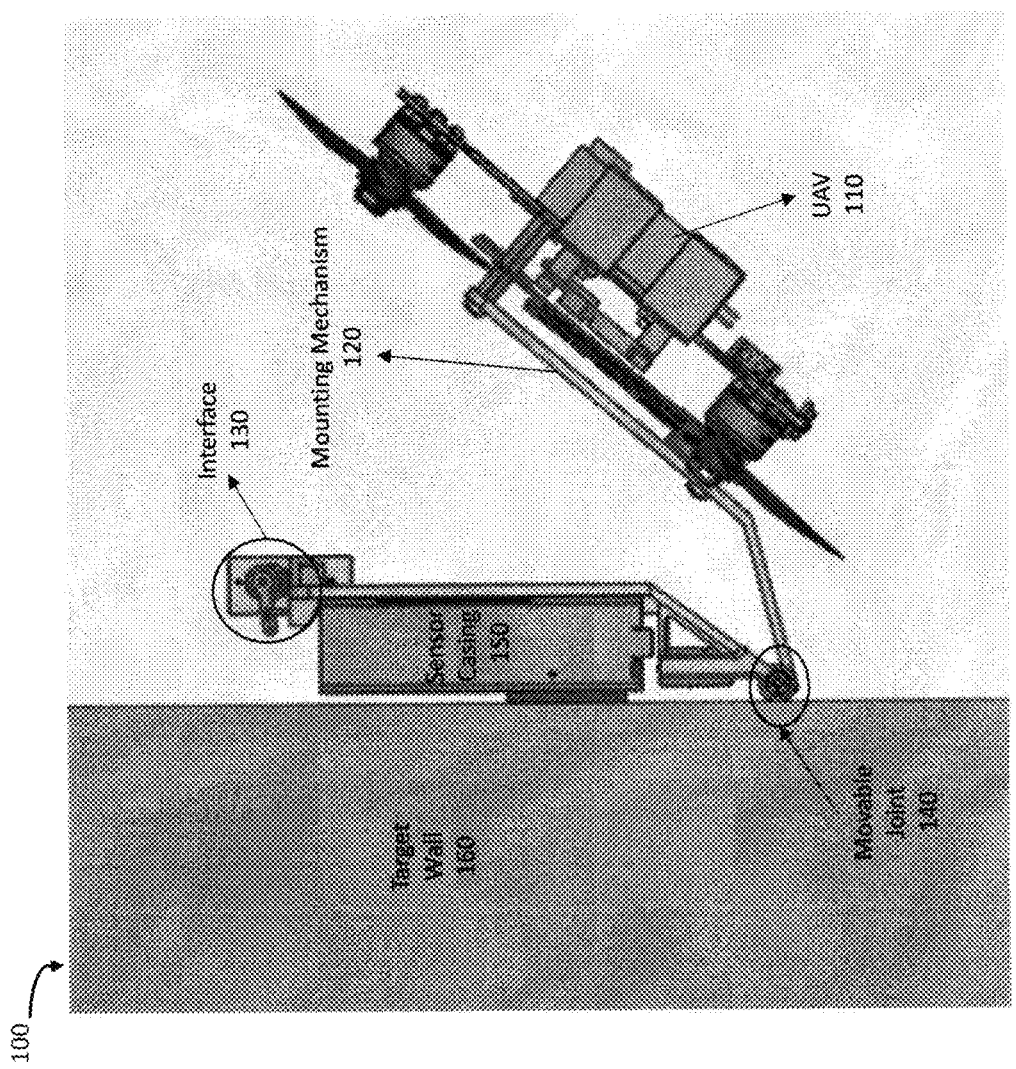
FIG. 1 is a schematic illustration of a sensor wall placing UAV, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "removing", "performing", "turning", "releasing", "activating" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
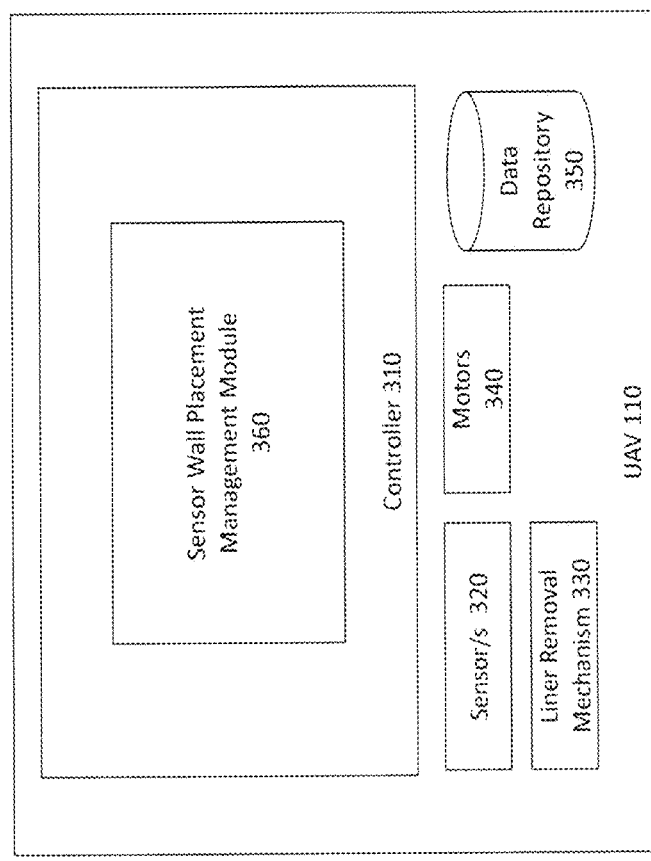
FIG. 3 is a block diagram schematically illustrating one example of a system for a sensor wall placing UAV, in accordance with the presently disclosed subject matter.
Figure 4:
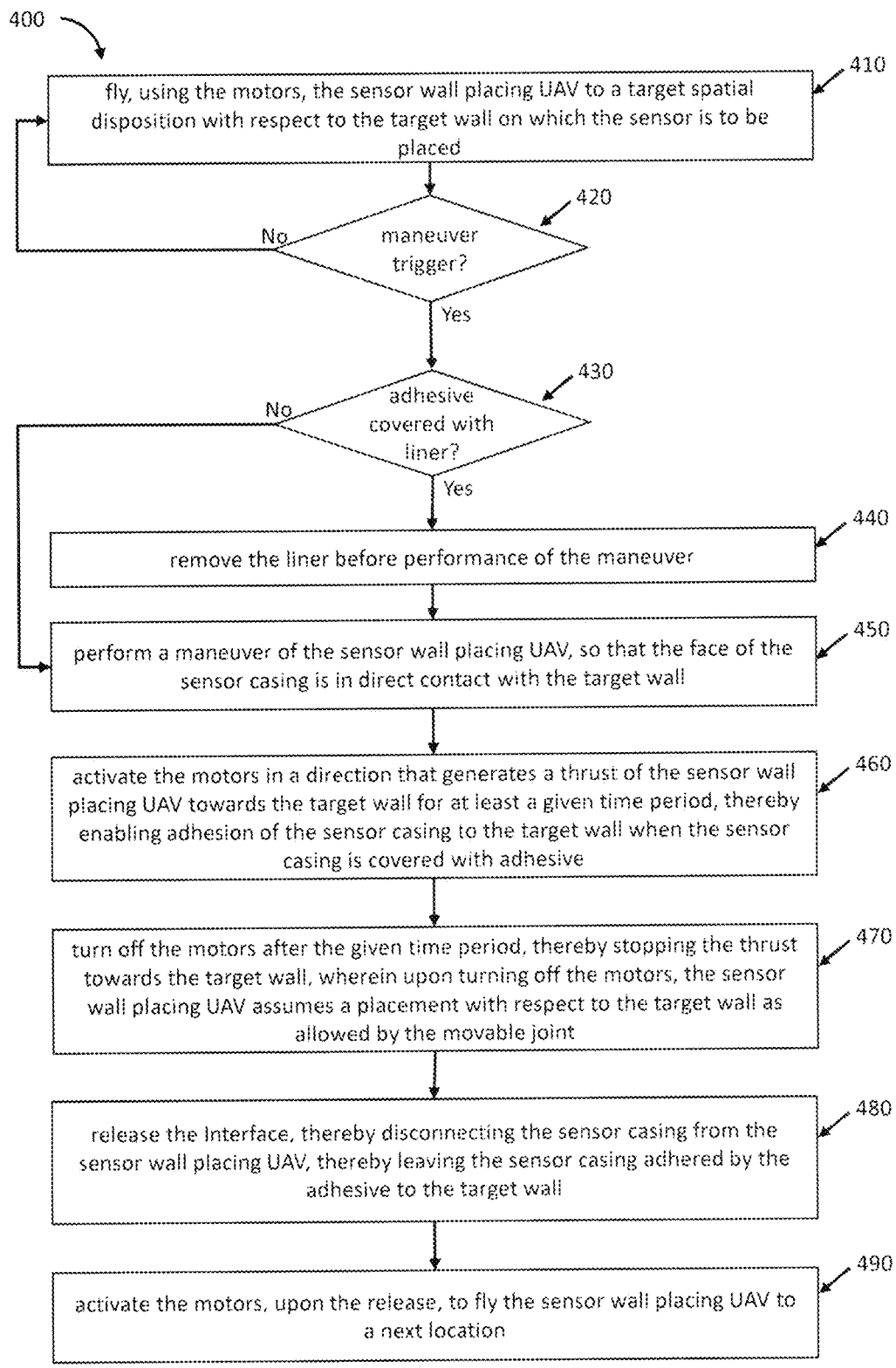
FIG. 4 is a flowchart illustrating one example of a sequence of operations carried out for a sensor wall placement process, in accordance with the presently disclosed subject matter.

In embodiments of the presently disclosed subject matter, fewer, more and/or different stages than those shown in FIG. 4 may be executed. In embodiments of the presently disclosed subject matter one or more stages illustrated in FIG. 4 may be executed in a different order and/or one or more groups of stages may be executed simultaneously. FIG. 3 illustrate a general schematic of the system architecture in accordance with an embodiment of the presently disclosed subject matter. Each module in FIG. 3 can be made up of any combination of software, hardware and/or firmware that performs the functions as defined and explained herein. The modules in FIG. 3 may be centralized in one location or dispersed over more than one location. In other embodiments of the presently disclosed subject matter, the system may comprise fewer, more, and/or different modules than those shown in FIG. 3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of a sensor wall placing UAV, in accordance with the presently disclosed subject matter.

According to the presently disclosed subject matter, environment 100, includes at least one sensor wall placing UAV 110. Please note that the terms sensor wall placing UAV 110 and UAV 110 are used herein interchangeably. UAV 110 can be a fixed-wing air vehicle, a vertical take-off and landing air vehicle, a helicopter, a quadcopter, a drone or any other type of unmanned air vehicle. UAVs 110 are commonly used nowadays to take part or to accomplish various missions or tasks that in the past required manned aircrafts. A non-limiting example of such a mission can be a disaster relief mission, wherein an area is hit by a disaster (e.g. an earthquake, a fire, a flood, etc.) and the UAVs 110 are utilized to bring information or to perform other tasks in the disaster hit area, without risking human operators. A UAV 110 may be used in this example to fly to a specific target within the disaster area and place one or more sensors on the target. An example of a target can be a target wall 160 of a house that is in the disaster area. In this example UAV 110 can fly to the target wall 160 and fasten one or more sensors to the target wall 160. An example of such sensors can be microphone sensors, used for recording sounds in the area of the target wall 160. The sounds captured by the microphones can be relayed back to a disaster response headquarters and used to locate survivors and to decide what kind of human assistance is required at the disaster area.

UAV 110 can be fully autonomous in fulfilling its missions. Alternatively, UAV 110 can be remotely piloted, controlled by human controllers from afar, or UAV 110 can have partial autonomous capabilities, requiring human intervention in some aspects of its mission. In our example, the navigation of the UAV 110 to the target wall 160 can be made autonomously, based on GPS readings and/or image analysis performed by the UAV 110 and/or other autonomous navigation methods employed by UAV 110 to navigate to the vicinity of the target wall 160. UAV 110 can additionally or optionally navigate to the vicinity of the target wall 160 by a human controller, controlling UAV 110 from a distant location.

The placement of sensors on a target can be a critical task, due to the target itself and/or due to the environment where the target is located. Continuing our example, the sensors can be placed on a high part of the target wall 160, a place that is hard to reach for a human or a human operated vehicle. Additionally, or optionally, target wall 160 can be located in a harsh environment that is unreachable for a human or a human operated vehicle. For example, target wall 160 can be located in a disaster hit area. An area that is dangerous for humans. This is the reason why the task of placing the sensors on the target wall 160 is delegated to UAV 110, thus completing the task of placing the sensors on the target wall 160, without risking human lives.

The sensors to be placed on the target wall 160 can be of varying kinds, such as: cameras, microphones, radars, acoustic sensors, proximity sensors, ultrasonic sensors, seismic sensors or any other type of sensor that can be placed by UAV 110. The types of sensors to be placed depend on the task the UAV 110 is taking part in. Continuing the above example, the sensors can be microphones, used for recording sounds in the area of the target wall 160. The sensors can include also image sensors, used for taking images of the area of the target wall 160.

The sensors can be situated within a sensor casing 150. The sensor casing 150 can hold one or more sensors of one or more types. The sensor casing 150 can have one or more openings and/or windows, wherein the openings and/or windows are located on the sensor casing 150 in a way that enables the sensors to sense from outside of the sensor casing 150. Sensor casing 150 can further include a Global Positioning System (GPS) receiver, providing geolocation and time information of the sensor casing 150. Sensor casing 150 can further include a communication device to support communication with the sensor casing 150, for example, the communication device can be used to send data collected by the sensors within the sensor casing 150, from the sensor casing 150 to a disaster response headquarters. The communication device can be additionally used to receive commands from the disaster response headquarters to the sensor casing 150.

The outer facing part of the sensor casing 150 can be covered with a layer of adhesive material that can be utilized to adhere the sensor casing 150 to the target wall 160. The outer facing part of the sensor casing is the part that is facing the target wall 160 when UAV 110 is placing the sensor casing 150 on the target wall 160.

The inner facing side of the sensor casing 150 can be connected to a mounting mechanism 120 using interface 130. In some cases, interface 130 can permanently attach the sensor casing 150 to the mounting mechanism 120. In these cases, interface 130 can be a kind of connector that connects sensor casing 150 to mounting mechanism 120 is a non-detachable manner. In other cases, interface 130 can detachably attach the sensor casing 150 to the mounting mechanism 120. For example, interface 120 can be a detachable connector. In these cases, the attachment or detachment of the sensor casing 150 from the mounting mechanism 120 can be controlled by UAV 110, for example by giving a command to a servo to release interface 120, thereby detaching sensor casing 150 from the mounting mechanism 120.

Mounting mechanism 120 can be connected to a top part of a body of UAV 110, in such a way that it is facing away from the top part of the UAV 110 body and does not interrupt the flight of UAV 110. Mounting mechanism 120 can be made from two plates, an upper plate that is connected to the sensor casing 150 through interface 130 and a lower plate that is connected to the top part of the body of UAV 110. The two plates can be joined between them, at one end of the two plates, by a movable joint 140. Movable joint 140 can allow for angular movement between the two plates of up to a certain angle. The angular movement can be allowed by movable joint 140 in a controlled fashion, thus allowing the angular movement when the movable joint 140 is unlocked and preventing the angular movement when the movable joint 140 is locked. UAV 110 may control the state (i.e. locked or unlocked states) of movable joint 140. For example, movable joint 140 can allow for an angle of between 30 to 150 degrees between the two plates.

FIG. 1 depicts a non-limiting example wherein the sensor casing 150 is adhered by the adhesive layer to target wall 160. The sensor casing 150 is connected through interface 130 to the mounting mechanism's 120 upper plate. The upper plate is joined with the lower plate of the mounting mechanism 120 through movable joint 140. Movable joint 140 allows for an angle between the two plates. In this non-limiting example, the angle is of 40 degrees between the plates. The lower plate of the mounting mechanism 120 is connected to the top part of the body of the UAV 110, thus UAV 110 is connected to the target wall 160 through the mounting mechanism 120 that is connected to the sensor casing 150 that is adhered to the target wall 160 by the adhesive layer.

Turning to FIGS. 2*a*, 2*b*, 2*c* and 2*d*, showing a schematic illustration of a sensor wall placing UAV, placing one or more sensors on a wall, in accordance with the presently disclosed subject matter.

Figure 2B:
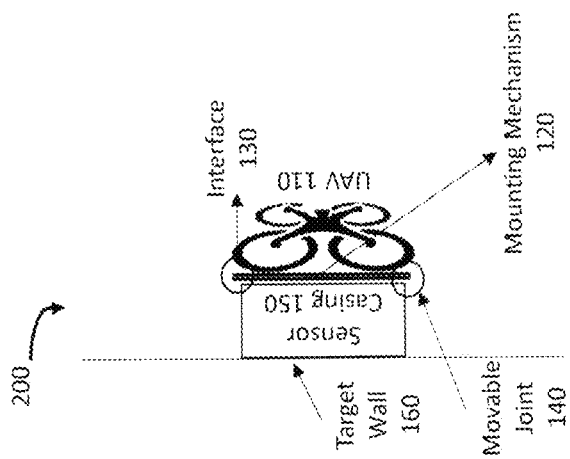
FIGS. 2a, 2b, 2c and 2d are schematic illustrations of a sensor wall placing UAV, placing one or more sensors on a wall, in accordance with the presently disclosed subject matter.
Figure 2A:
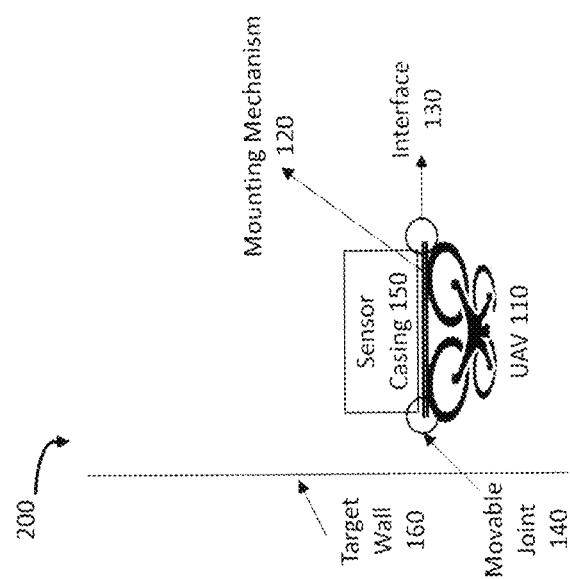

FIG. 2*a* illustrates a non-limiting example wherein UAV 110 is hovering above the ground in the vicinity of the target wall 160 before placement of the sensor casing 150 on the target wall 160.

According to the presently disclosed subject matter, environment 200, includes at least one UAV 110. Sensor casing 150 is fastened to a mounting mechanism 120 through an interface 130. Mounting mechanism 120 is connected to the top part of the body of UAV 110, in such a way that it is facing away from the top part of the UAV 110 body and does not interrupt the flight of UAV 110.

UAV 110 can fly, using its motors, to a target spatial disposition with respect to target wall 160. The target spatial disposition with respect to target wall 160 can be a certain range of distance of UAV 110 from the target wall 160 that allows for UAV 110 to maneuver for placement of sensor casing 150 on target wall 160, as further detailed herein, inter alia with respect to FIG. 2*b*. The navigation of UAV 110 to the target spatial disposition with respect to the target wall 160 can be fully autonomous, based on GPS readings and/or image analysis performed by the UAV 110 and/or other autonomous navigation methods employed by UAV 110 to navigate to the target spatial disposition with respect to target wall 160. Alternatively, UAV 110 can be remotely piloted to the target spatial disposition, controlled by human controllers from afar, or UAV 110 can have partial autonomous capabilities, requiring human intervention in some aspects of the navigation.

UAV 110 can further include one or more distance determination sensors (e.g. a LIght Detection And Ranging (LIDAR) sensor, a proximity sensor, a sonar, a Time Of Flight (TOF) camera, an Infra-Red (IR) sensor, etc.) utilized to determine a current spatial disposition of UAV 110 with respect to the target wall 160, as further detailed herein, inter alia with respect to FIG. 4.

FIG. 2*b* illustrates a non-limiting example wherein UAV 110 is placing the sensor casing 150 upon the target wall 160.

Upon reaching the target spatial disposition with respect to the target wall 160, UAV 110 preforms a maneuver so that the outer face of the sensor casing 150, which is covered with a layer of adhesive material, is in direct contact with the target wall 160. The maneuver can be achieved by UAV 110 utilizing its motors in order to change its disposition from a substantially horizontal disposition to a substantially vertical disposition. Upon sensor casing 150 is in direct contact with the target wall, UAV 110 may activate its motors in a direction that generates a thrust of the UAV 110 towards the target wall 160 for at least a given time period, thereby causing pressure on the sensor casing 150 in the direction of the target wall 160, enabling the adhesion of the sensor casing 150 to the target wall 160 utilizing the layer of adhesive material. For example, the UAV 110 may generate a thrust of 0.5 kilograms for a period of 5 seconds in order for the adhesive layer to adhere the sensor casing 150 to the target wall 160.

The trigger to the performance of the maneuver can be fully autonomous, based on readings of proximity sensors, touch sensors and/or accelerometers of UAV 110. The readings of these sensors can be utilized to monitor an occurrence of a maneuver trigger (e.g. that UAV 110 has made contact with target wall 160), as further detailed herein, inter alia with respect to FIG. 4. Alternatively. UAV 110 can be remotely piloted and the trigger to preform the maneuver can be controlled by human controllers from afar, or UAV 110 can have partial autonomous capabilities, requiring human intervention in some aspects of triggering of the maneuver.

The performance of the maneuver itself can be fully autonomous, based on GPS readings and/or image analysis performed by the UAV 110 and/or other autonomous navigation methods employed by UAV 110 to preform the maneuver. Alternatively, UAV 110 can be remotely piloted to perform the maneuver by human controllers from afar, or UAV 110 can have partial autonomous capabilities, requiring human intervention in some aspects of the maneuver.

Upon the adhesion of the sensor casing 150 to the target wall 160, the senor casing 150 and the sensors within have been placed on target wall 160 and the sensors can sense the environment adjacent to the target wall 160. In some cases, this will complete a sensor placement process, and UAV 110 can stay adhered to the target wall 160. For example, sensor casing can include one or more microphones and upon placement of the sensor casing 150 on the target wall 160, the microphone sensors can record sounds in the area of the target wall 160. These sounds captured by the microphones can be relayed back to a disaster response headquarters and used to locate survivors and to decide what kind of human assistance is required at the disaster area. In other cases, UAV 110 can detach from target wall 160 and continue to a next mission, as further detailed herein, inter alia with respect to FIGS. 2c and 2d.

Figure 2D:
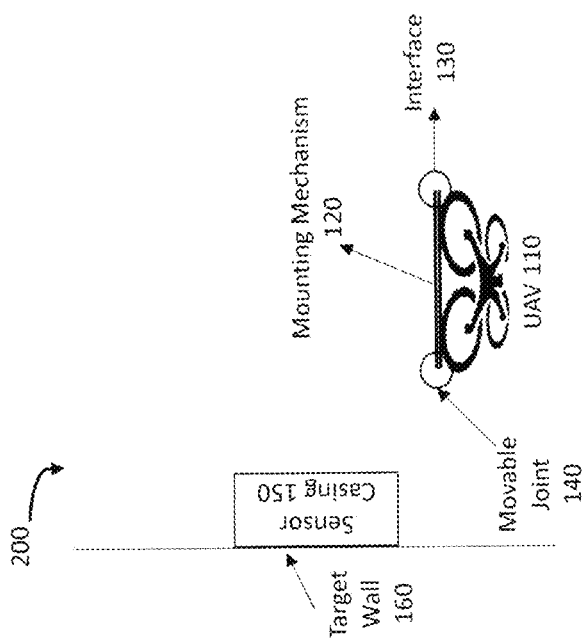
Figure 2C:
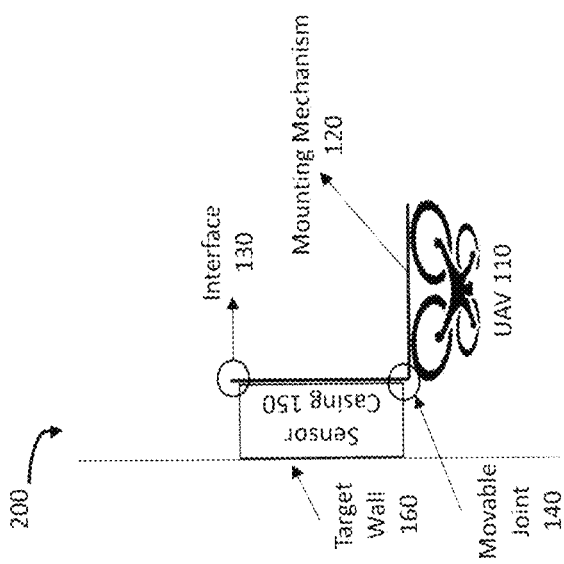

FIG. 2c illustrates a non-limiting example wherein UAV 110 adhered sensor casing 150 to the target wall 160 and wherein UAV 110 is connected to the sensor casing 150 through mounting mechanism 120 and interface 130.

According to the presently disclosed subject matter, upon placing the sensor casing 150 on target wall 160 by utilizing the adhesive material, UAV 110 can turn off its motors, thereby stopping the thrust towards the target wall 160. Upon the cessation of the thrust, UAV 110 assumes a placement with respect to target wall 160, as allowed by the movable joint 140. The placement of UAV 110 is due to the structure of the mounting mechanism 120. Mounting mechanism 120 can be made from two plates, an upper plate that is connected to the sensor casing 150 through interface 130 and a lower plate that is connected to the body of UAV 110. The two plates can be joined between them, at one end of the two plates, by a movable joint 140. Movable joint 140 can allow for angular movement between the two plates of up to a certain angle, thus upon stopping the thrust towards the target wall 160, UAV 110 will fall, or in some cases where the thrust will gradually decrease, will gradually fall, to a position allowed by the movable joint. In the illustrated example in FIG. 2c, the angle allowed by movable joint 140 is a 90 degrees angle between the two plates, thereby creating a placement of UAV 110 of 90 degrees angle with respect to target wall 160. The angle of UAV 110 with respect to the target wall 160 may be a different angle. It is to be noted that UAV 110 remains stuck to the target wall 160, as UAV 110 is connected to the sensor casing 150 through the mounting mechanism 120 and the sensor casing 150 is adhered to the target wall 160 through the adhesive layer.

In some cases, the angular movement can be allowed by movable joint 140 in a controlled fashion, thus allowing the angular movement when the movable joint 140 is unlocked and preventing the angular movement when the movable joint 140 is locked. In these cases, UAV 110 can control the state (i.e. locked or unlocked states) of movable joint 140. For example, movable joint 140 can allow an angler movement of UAV 110 only when in unlocked state, thus UAV 110 will change the state of movable joint 140 to unlocked stated upon turning off its motors thereby stopping the thrust and assuming the placement.

FIG. 2d illustrates a non-limiting example wherein UAV 110 is hovering above the ground in the vicinity of the target wall 160 after placement of the sensor casing 150 on the target wall 160.

According to the presently disclosed subject matter, upon assuming the placement, UAV 110 can use interface 130 to release sensor casing 150. In some cases, interface 130 can detachably attach the sensor casing 150 to the mounting mechanism 120. In these cases, the attachment or detachment of the sensor casing 150 from the mounting mechanism 120 can be controlled by UAV 110, for example by giving a command to a servo to release interface 130, thereby detaching sensor casing 150 from the mounting mechanism 120.

Upon the release of interface 130, mounting mechanism 120 closes (i.e. the two plates are at a 0 degrees angle between them) and UAV 110 is detached from sensor casing 150 and thus also from target wall 160. UAV 110 can then activate its motors and fly to a location of its next mission. It is to be noted that sensor casing 150 stays attached to the target wall 160.

An example can be of UAV 110 releasing interface 130, activating its motors and flying to a disaster response headquarters. There, UAV 110 may be loaded with another senor casing 150 by connecting interface 130 to another sensor casing 150. UAV 110 can then fly to a new target wall 160 to place another sensor casing 150.

Attention is drawn to FIG. 3, a block diagram schematically illustrating one example of a system for a sensor wall placing UAV, in accordance with the presently disclosed subject matter.

According to certain examples of the presently disclosed subject matter. UAV 110 can comprise motors 340, capable of generating a lift for UAV 110. UAV 110 may additionally comprise of one or more sensors 320. Sensors 320 can include proximity sensors, touch sensors and/or accelerometers. The readings of sensors 320 can be utilized to maintain an occurrence of a maneuver trigger (e.g. that UAV 110 has made contact with target wall 160). Sensors 320 can further include one or more distance determination sensors (e.g. a LIDAR sensor, a proximity sensor, a sonar, a TOF camera, an IR sensor, etc.) utilized to determine a current spatial disposition of UAV 110 with respect to the target wall 160. UAV 110 may be a fixed-wing air vehicle, a vertical take-off and landing air vehicle, a helicopter, a quadcopter, a drone or any other type of unmanned air vehicle. UAV 110 may be fully autonomous in fulfilling its missions, it may be remotely piloted, or it may have partial autonomous capabilities, requiring human intervention in some aspects of its mission.

UAV 120 can further comprise a liner removal mechanism 330, capable of removing a liner that is set on top of an adhesive layer that is covering a top portion of the sensor casing 150.

UAV 110 can further comprise, or be otherwise associated with, a data repository 350 (e.g. a database, a storage system, a memory including Read Only Memory—ROM, Random Access Memory—RAM, or any other type of memory, etc.) configured to store data, including inter alia navigational data, thrust threshold data, etc. Data repository 350 can be further configured to enable retrieval and/or update and/or deletion of the stored data. It is to be noted that in some cases, data repository 350 can be distributed, while the UAV 110 has access to the information stored thereon. e.g. via a wireless network to which UAV 110 is able to connect.

UAV 110 further comprises a controller 310. Controller 310 can be one or more processing units (e.g. central processing units), microprocessors, microcontrollers or any other computing devices or modules, including multiple and/or parallel and/or distributed processing units, which are adapted to independently or cooperatively process data for controlling relevant resources of the UAV 110 and for enabling operations related to resources of the UAV 110.

The controller 310 can comprise a sensor wall placement management module 360.

According to some examples of the presently disclosed subject matter, sensor wall placement management module 360 can be configured to perform a sensor wall placement process, as further detailed herein, inter alia with respect to FIG. 4.

FIG. 4 is a flowchart illustrating one example of a sequence of operations carried out for a sensor wall placement process, in accordance with the presently disclosed subject matter.

According to certain examples of the presently disclosed subject matter, sensor wall placing UAV 110 can be configured to perform a sensor wall placement process 400, e.g. by sensor wall placing UAV 110 utilizing the sensor wall placement management module 360.

For this purpose, controller 310 can be configured to fly sensor wall placing UAV 110, using the motors 340, to a target spatial disposition with respect to the target wall 160 on which the sensor is to be placed (block 410).

UAV 110 can include one or more distance determination sensors 320 (e.g. a LIDAR sensor, a proximity sensor, a sonar, a TOF camera, an IR sensor, etc.) utilized to determine a current spatial disposition of UAV 110 with respect to the target wall 160. This information can be used by controller 310 to determine the navigation of UAV 110, utilizing motors 340, in order to bring UAV 110 a target spatial disposition with respect to the target wall 160 from which the maneuver can be performed. Controller 310 can be configured for this purpose to determine a current spatial disposition of the sensor wall placing UAV 110 with respect to the target wall 160 based on a plurality of readings obtained by the distance determination sensors 320, wherein a first reading is obtained from a first orientation of the distance determination sensors 320 with respect to the target wall 160 and a second reading is obtained from a second orientation of the distance determination sensors 320 with respect to the target wall 160. For example, UAV 110 can rotate left and right, thereby changing the orientation of the distance determination sensors 320 with respect to the target wall 160, thus enabling taking two or more readings from distance determination sensors 320 each taken with the distance determination sensors 320 having a different orientation with respect to the target wall 160.

After UAV 110 reaching the target spatial disposition with respect to the target wall 160, controller 310 can be configured to monitor occurrence of a maneuver trigger (bock 420).

UAV 110 may additionally comprise of one or more sensors 320. Sensors 320 can include proximity sensors, touch sensors and accelerometers. The readings of sensors 320 can be utilized to monitor occurrence of a maneuver trigger in one of the following cases: a proximity sensor 320 indicates that the sensor wall placing UAV 110 is at a given distance from the target wall 160, an accelerometer 320 indicates that the sensor wall placing UAV 110 contacted the target wall 110 or a touch sensor 320 indicates that a part of the wall placing UAV 110 on which the touch sensor is placed made contact with the target wall 160.

If no maneuver trigger occurred, controller 310 can be configured to perform block 410. If a maneuver trigger occurred, controller 310 can be configured to perform block 430.

Controller 310 can be configured to check if the laver of adhesive material is covered with a liner (block 430).

A liner is a protective film that can be placed on the layer of adhesive material. The liner may protect the adhesive material from contacting dust and dirt. The liner film should be removed prior to using the adhesive material. In our example the liner is removed before the maneuver bringing the layer of adhesive material with direct contact with the target wall 160. The liner can be removed by a liner removal mechanism 330. An example of a liner removal mechanism 330 can be a mechanical arm, able of removing the liner upon command from the controller 310.

If there is no liner covering the layer of adhesive material, controller 310 can be configured to perform block 450. If there is liner covering the layer of adhesive material, controller 310 can be configured to perform block 440.

Controller 310 can be configured to remove the liner before performance of the maneuver, by utilizing the liner removal mechanism 330 (block 440).

It is to be noted that in some cases there is no use of liner. In these cases, blocks 430 and 440 are optional.

Controller 310 can be configured to perform a maneuver of the sensor wall placing UAV 110, so that the adhesive covered face of the sensor casing 150 is in direct contact with the target wall 160 (block 450).

The maneuver is performed by controller 310 activating motors 340 in rotation speeds that cause the sensor wall placing UAV 110 to bring the adhesive covered face of the sensor casing 150 into direct contact with the target wall 160.

In some cases, UAV 110 is a quadcopter equipped with four rotors (each controlled by a respective motor of the motors 340), and the maneuver is performed by firstly: causing a pair of the rotors that are farther from the target wall to rotate at a different speed (faster or slower) than another pair of rotors that are closer to the target wall thereby changing an angle of the UAV with respect to the target wall. This can be performed by (a) causing two of the rotors that are farther from the target wall to rotate faster than the two rotors that are closer to the target wall 160 (either by reducing the rotation speed of the two motors that are closer to the target wall 160 or by increasing the rotation speed of the two rotors that are farther from the target wall 160), which will result in the UAV 110 changing its angle with respect to the target wall 160, or (b) causing two of the rotors that are closer to the target wall 160 to rotate faster than the two rotors that are farther than the target wall 160 (either by reducing the rotation speed of the two rotors that are farther from the target wall 160 or by increasing the rotation speed of the two rotors that are closer to the target wall 160), which will result in the UAV 110 changing its angle with respect to the target wall 160.

In some cases, at the first stage of the maneuver it is desirable to obtain an acute angle between the UAV 110 and the target wall 160 (e.g. a positive or negative angle of more than 5° or more than 10°, or more than 15°, etc.). Once such angle is obtained, the maneuver can continue with increasing the rotation speed of all of the rotors faster, in a manner that generates acceleration towards the target wall, thereby causing the UAV 110 to push itself onto the target wall 160, which will cause it to further change its orientation with respect to the target wall 160 towards a substantially vertical orientation, resulting in the adhesive covered face of the sensor casing 150 making direct contact with the target wall 160.

Upon performance of the maneuver, controller 310 can be further configured to activate the motors in a direction that generates a thrust of the sensor wall placing UAV towards the target wall for at least a given time period, thereby enabling adhesion of the sensor casing to the target wall when the sensor casing is covered with adhesive (block 460).

It is to be noted that in some cases there is no need to generate a thrust, as the layer of adhesive material is designed to adhere to the target wall 160 upon contact, without the need to generate pressure upon it. In these cases, block 460 is optional.

Controller 310 can be further configured to turn off the motors 340 after the given time period, thereby stopping the thrust towards the target wall 160, wherein upon turning off the motors 340, the sensor wall placing UAV 110 assumes a placement with respect to the target wall 160 as allowed by the movable joint 140 (block 470).

Upon turning off motors 340, controller 310 can be further configured to release the interface 130, thereby disconnecting the sensor casing 150 from the sensor wall placing UAV 110, thereby leaving the sensor casing 150 adhered by the adhesive to the target wall 160 (block 480).

Upon the release of interface 130, controller 310 can be further configured to activate the motors 340 to fly the sensor wall placing UAV 110 to a next location (block 490).

It is to be noted that in some cases the UAV 110 stays attached to the target wall 160. In these cases, blocks 470, 480 and 490 are optional.

It is to be noted that, with reference to FIG. 4, some of the blocks can be integrated into a consolidated block or can be broken down to a few blocks and/or other blocks may be added. Furthermore, in some cases, the blocks can be performed in a different order than described herein (for example, block 440 can be performed before block 420, etc.). It is to be further noted that some of the blocks are optional (for example, blocks 440, 470, 480 and 490). It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A sensor wall placing Unmanned Aerial Vehicle (UAV) comprising:
   a UAV frame;
   a plurality of motors connected to the UAV frame and capable of lifting and maneuvering the sensor wall placing UAV;
   a mounting mechanism configured to detachably attach, via an interface, a sensor casing comprising at least one sensor, during flight of the sensor wall placing UAV, the mounting mechanism being connected to a top part of the sensor wall placing UAV so that the mounting mechanism is facing upwards from the top part of the sensor wall placing UAV, and upon detachably attaching the sensor casing to the mounting mechanism, a face of the sensor casing faces upwards and away from the sensor wall placing UAV thereby enabling the sensor wall placing UAV to perform a maneuver that results in direct contact between the face of the sensor casing and a target wall; and
   a processing resource configured to:
   fly, using the motors, the sensor wall placing UAV to a target spatial disposition with respect to the target wall on which the sensor is to be placed;
   upon reaching the target spatial disposition, perform the maneuver of the sensor wall placing UAV, so that the face of the sensor casing is in direct contact with the target wall; and
   activate the motors in a direction that generates a thrust of the sensor wall placing UAV towards the target wall for at least a given time period, thereby enabling adhesion of the sensor casing to the target wall when the sensor casing is covered with adhesive.

2. The sensor wall placing UAV of claim 1, wherein the mounting mechanism is connected to the sensor wall placing UAV via a movable joint.

3. The sensor wall placing UAV of claim 2, wherein the interface is releasable and wherein the processing resource is further configured to:
   turn off the motors after the given time period, thereby stopping the thrust towards the target wall, wherein upon turning off the motors, the sensor wall placing UAV assumes a placement with respect to the target wall as allowed by the movable joint; and
   release the interface, thereby disconnecting the sensor casing from the sensor wall placing UAV, thereby leaving the sensor casing adhered by the adhesive to the target wall.

4. The sensor wall placing UAV of claim 3, wherein the processing resource is further configured to activate the motors, upon the release, to fly the sensor wall placing UAV to a next location.

5. The sensor wall placing UAV according to claim 1, wherein the adhesive is covered with a liner, and wherein the sensor wall placing UAV further comprises a liner removal mechanism, configured to remove the liner before performance of the maneuver.

6. The sensor wall placing UAV according to claim 1, wherein the processing resource is configured to perform the maneuver upon a maneuver trigger, wherein the maneuver trigger includes one of:
   a. a proximity sensor of the sensor wall placing UAV indicates that the sensor wall placing UAV is at a given distance from the target wall;
   b. an accelerometer of the sensor wall placing UAV indicates that the sensor wall placing UAV made contact with the target wall; or
   c. a touch sensor indicates that a part of the wall placing UAV on which the touch sensor is placed made contact with the target wall.

7. The sensor wall placing UAV according to claim 1, wherein the UAV is a quadcopter equipped with four rotors, each of the rotors controlled by a respective motor of the motors, and wherein the maneuver is performed by: (a) causing a pair of the rotors that are farther from the target wall to rotate at a different speed than another pair of rotors that are closer to the target wall thereby changing an angle of the UAV with respect to the target wall, and (b) increasing a rotation speed of the four rotors to generate acceleration towards the target wall, thereby causing the UAV to push itself onto the target wall.

8. The sensor wall placing UAV according to claim 1, wherein the target spatial disposition is defined by a given position from the target wall and a given orientation of the sensor wall placing UAV with respect to the target wall.

9. The sensor wall placing UAV of claim 8, wherein the sensor wall placing UAV further comprises one or more distance determination sensors, including one or more of:
   a. a LIght Detection And Ranging (LIDAR);
   b. a proximity sensor;
   c. a sonar;
   d. a Time Of Flight (TOF) camera; or
   e. an Infra-Red (IR) sensor.

10. The sensor wall placing UAV of claim 9, wherein the processing resource is further configured to determine a current spatial disposition of the sensor wall placing UAV with respect to the target wall based on a plurality of readings obtained by the distance determination sensors, wherein a first reading is obtained from a first orientation of the distance determination sensors with respect to the target wall and a second reading is obtained from a second orientation of the distance determination sensors with respect to the target wall.

11. A method of operating a sensor wall placing Unmanned Aerial Vehicle (UAV),
the method comprising:
   flying, using a plurality of motors connected to a UAV frame of the sensor wall placing UAV and capable of lifting and maneuvering the sensor wall placing UAV, the sensor wall placing UAV to a target spatial disposition with respect to a target wall on which at least one sensor is to be placed, wherein the sensor wall placing UAV having a mounting mechanism configured to detachably attach, via an interface, a sensor casing comprising the at least one sensor, during flight of the sensor wall placing UAV, the mounting mechanism being connected to the sensor wall placing UAV so that the mounting mechanism is facing away from a top part of the sensor wall placing UAV, and upon detachably attaching the sensor casing to the mounting mechanism, a face of the sensor casing faces upwards and away from the sensor wall placing UAV thereby enabling the sensor wall placing UAV to perform a maneuver that results in direct contact between the face of the sensor casing and the target wall;
   upon reaching the target spatial disposition, performing the maneuver of the sensor wall placing UAV, so that the face of the sensor casing is in direct contact with the target wall; and
   activating the motors in a direction that generates a thrust of the sensor wall placing UAV towards the target wall for at least a given time period, thereby enabling adhesion of the sensor casing to the target wall when the sensor casing is covered with adhesive.

12. The method of claim 11, wherein the mounting mechanism is connected to the sensor wall placing UAV via a movable joint.

13. The method of claim 12, wherein the interface is releasable and wherein the method further comprises:
   turning off the motors after the given time period, thereby stopping the thrust towards the target wall, wherein upon turning off the motors, the sensor wall placing UAV assumes a placement with respect to the target wall as allowed by the movable joint; and
   releasing the interface, thereby disconnecting the sensor casing from the sensor wall placing UAV, thereby leaving the sensor casing adhered by the adhesive to the target wall.

14. The method of claim 13, further comprising activating the motors, upon the releasing, to fly the sensor wall placing UAV to a next location.

15. The method according to claim 11, wherein the adhesive is covered with a liner, and wherein the method further comprises removing the liner, using a liner removal mechanism, before performance of the maneuver.

16. The method according to claim 11, wherein the maneuver is performed upon a maneuver trigger, wherein the maneuver trigger includes one of:
   a. a proximity sensor of the sensor wall placing UAV indicates that the sensor wall placing UAV is at a given distance from the target wall;
   b. an accelerometer of the sensor wall placing UAV indicates that the sensor wall placing UAV made contact with the target wall; or
   c. a touch sensor indicates that a part of the wall placing UAV on which the touch sensor is placed made contact with the target wall.

17. The method according to claim 11, wherein the UAV is a quadcopter equipped with four rotors, each of the rotors controlled by a respective motor of the motors, and wherein the maneuver is performed by: (a) causing a pair of the rotors that are farther from the target wall to rotate at a different speed than another pair of rotors that are closer to the target wall thereby changing an angle of the UAV with respect to the target wall, and (b) increasing a rotation speed of the rotors to generate acceleration towards the target wall, thereby causing the UAV to push itself onto the target wall.

18. The method according to claim 11, wherein the target spatial disposition is defined by a given position from the target wall and a given orientation of the sensor wall placing UAV with respect to the target wall.

19. The method of claim 11, wherein the sensor wall placing UAV further comprises one or more distance determination sensors, and wherein the method further comprising determining a current spatial disposition of the sensor wall placing UAV with respect to the target wall based on a plurality of readings obtained by the distance determination sensors, wherein a first reading is obtained from a first orientation of the distance determination sensors with respect to the target wall and a second reading is obtained from a second orientation of the distance determination sensors with respect to the target wall.

20. A non-transitory computer readable storage medium having computer readable program code embodied therewith, the computer readable program code, executable by a processing resource of a computer to perform a method, the method comprising:

flying, using a plurality of motors connected to a UAV frame of the sensor wall placing UAV and capable of lifting and maneuvering the sensor wall placing UAV, the sensor wall placing UAV to a target spatial disposition with respect to a target wall on which at least one sensor is to be placed, wherein the sensor wall placing UAV having a mounting mechanism configured to detachably attach, via an interface, a sensor casing comprising the at least one sensor, during flight of the sensor wall placing UAV, the mounting mechanism being connected to the sensor wall placing UAV so that the mounting mechanism is facing away from a top part of the sensor wall placing UAV, and upon detachably attaching the sensor casing to the mounting mechanism, a face of the sensor casing faces upwards and away from the sensor wall placing UAV thereby enabling the sensor wall placing UAV to perform a maneuver that results in direct contact between the face of the sensor casing and the target wall;

upon reaching the target spatial disposition, performing the maneuver of the sensor wall placing UAV, so that the face of the sensor casing is in direct contact with the target wall; and activating the motors in a direction that generates a thrust of the sensor wall placing UAV towards the target wall for at least a given time period, thereby enabling adhesion of the sensor casing to the target wall when the sensor casing is covered with adhesive.

\* \* \* \* \*